United States Patent [19]

Reyes

[11] 4,197,895
[45] Apr. 15, 1980

[54] TRACTION DEVICE FOR MOTOR VEHICLES

[76] Inventor: Jose V. Reyes, 2874 Broxon La., Boise, Id. 83705

[21] Appl. No.: 947,535

[22] Filed: Oct. 2, 1978

[51] Int. Cl.² .............................................. B60C 29/00
[52] U.S. Cl. ..................................... 152/416; 141/38; 152/208
[58] Field of Search .................... 152/416, 417, 208; 123/198 C; 141/38; 417/231

[56] References Cited

U.S. PATENT DOCUMENTS

| | | | |
|---|---|---|---|
| 899,620 | 9/1908 | Ross | 152/415 |
| 1,043,583 | 11/1912 | Forry | 123/198 C |
| 3,200,858 | 8/1965 | Kampert | 141/38 |
| 3,844,319 | 10/1974 | Cristante | 152/416 |

*Primary Examiner*—Richard A. Bertsch
*Assistant Examiner*—D. W. Underwood

[57] ABSTRACT

A traction device for a motor vehicle comprising a hose connecting the vehicle's exhaust pipe to an air pressure pump inlet. The outlet of the pump is detachably connected to the inlet valve of the vehicle's tire. An outlet valve for exiting cold air is connected to another hose communicating with a temperature gage and a pressure gage.

2 Claims, 5 Drawing Figures

TRACTION DEVICE FOR MOTOR VEHICLES

BACKGROUND OF THE INVENTION

The invention relates to devicing devices in general and in particular to a device for providing traction for a motor vehicle by heating the air in the vehicle's tires to thereby melt an ice or snow layer.

An object of the invention is to provide such a device which will heat the vehicle's tires by using the hot exhaust fumes from the vehicle's engine.

Another object is to provide such a device which is simple and sturdy in construction and operation.

These and other important objects of the invention will become apparent from the following description and appended drawing. These are not limiting, since changes in detail construction may be made within the scope of the invention.

Figure 1:
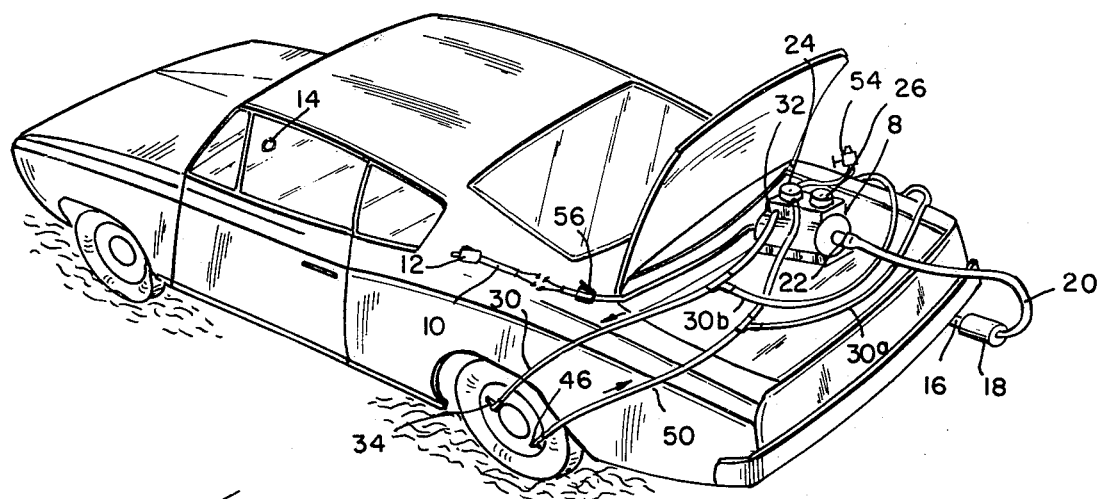
FIG. 1 is a perspective view of a vehicle with the traction device.
Figure 2:
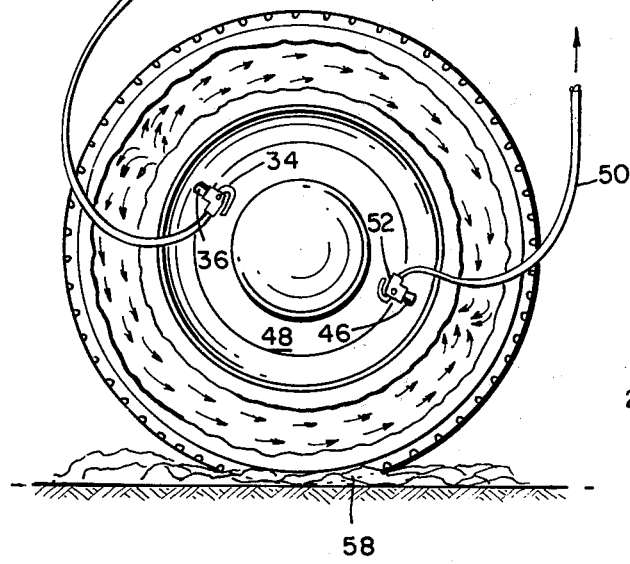
FIG. 2 is an enlarged view of the vehicle rear wheel shown in FIG. 1.
Figure 3:
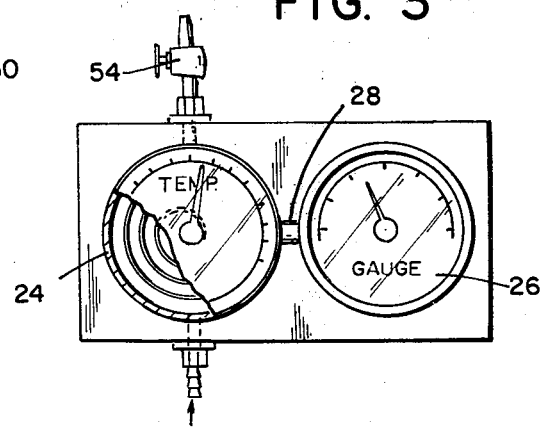
FIG. 3 illustrates the gauges used in the device.
Figure 4:
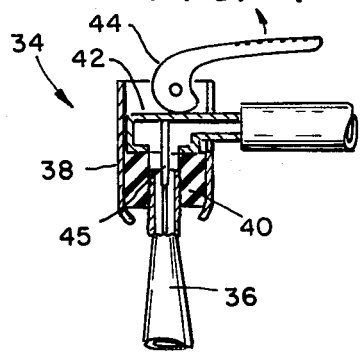
FIG. 4 is an enlarged detail of one of a pair of valves used in the device.
Figure 5:
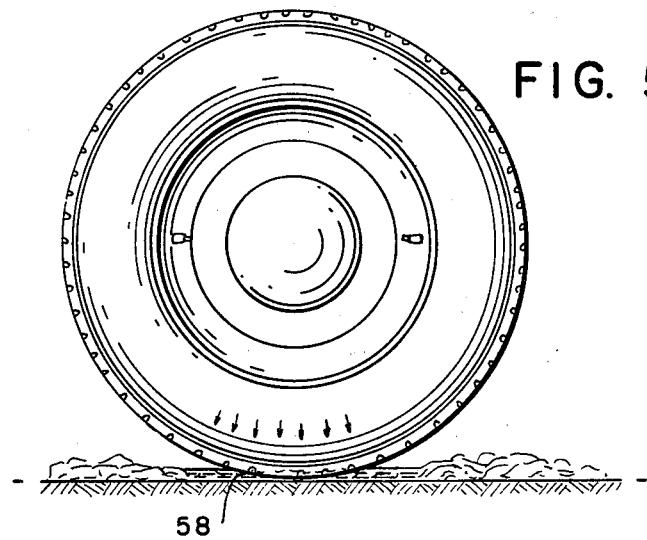
FIG. 5 illustrates the action of the device on a frozen surface.

Referring now to the drawing in detail, the traction device shown in the trunk of a vehicle 6, comprises an air pump 8 driven by an electric motor (not shown) connectable by means of a cord 10 and a male plug 12 with the vehicle's cigar lighter outlet 14. Detachably securable with one end to the exhaust pipe 16 by means of an adaptor 18, is a hose 20, the other end of the hose being connected to the inlet of pump 8 at 22.

Mounted on pump 8 are a temperature gage 24 and air pressure gage 26 which communicate by means of tubing 28. A hot air hose 30 is connected with one end to the outlet of pump 8 at 32. The other end of hot air hose 30 is provided with a fitting 34, by means of which this hose can be connected to tire valve 36. The fitting, of known construction, is of the type used to attach a hand pump hose to a tire valve. It comprises a sleeve 38 and a rubber or plastic insert 40 which fits over valve 36. A flexible plate 42 may be depressed by turning cam 44, thus displacing valve steam 45. A second valve 46 is installed in wheel rim 48 by drilling an appropriate hole in the latter. A cold air escape hose 50 may be detachably secured with one end to valve 46 by means of fitting 52 which is similar in construction to fitting 34. The other end of the cold air escape hose is connected to temperature gage 24. The temperature gage is provided with a valve 54, which is kept open until the cold air in the tire is replaced by the incoming hot air delivered by the pump. Branch cold and hot air escape hoses 30a and 30b, respectively, are provided for attachment to the other rear wheel (not shown). As soon as the hot air reaches a temperature of 150°-200° F., valve 54 is closed by the operator while pump 8 is permitted to operate until gage 26 indicates the desired tire pressure which normally ranges between 25-35 lbs/in. As soon as the desired pressure has been reached, the power to the pump is shut off by means of switch 56.

In operation, the vehicle engine is started and run until it is warmed up sufficiently to cause hot exhaust fumes to pass from exhaust pipe 16 through adapter 18 and hose 20 into the inlet of pump 8 which has previously been energized through electrical cord 10. Valve 54 is opened to allow cold air to escape through temperature gage 24. The pump operation is continued until hot air displaces the cold air, at which time the temperature gage indicates about 150°-200° F., the normal exhaust gases temperature. Valve 54 is then closed, whereby hot air enters the tires. The pump 8 continues in operation until usual tire pressure of 25-35 lbs/sq. in. is reached, at which time the pump is shut off by switch 56. The heated tires cause the ice or snow layers 58 to melt, thus providing traction for the vehicle. The hoses may then be removed from the tire valves and the power cord unplugged from the cigar lighter receptacle 14.

I claim:

1. A traction device for an internal combustion powered vehicle provided with a hot exhaust pipe for combusted gases operated by heating the tires of the vehicle, comprising an air pressure pump having an inlet and an outlet, an inlet hose connecting said exhaust pipe with the pump's inlet, an outlet hose detachably connecting said outlet with the interior of the tire through an inlet valve, said tire being provided with an exhaust valve, a cold air exhaust hose detachably secured to said exhaust valve with one end, a temperature gage mounted on said pump, said exhaust hose having its other end connected to said temperature gage, and said temperature gage having an outlet valve for cold air, a pressure gage communicating with said temperature gage and mounted on said pump and means connecting the pump to a power source.

2. The traction device as claimed in claim 1, further provided with a pair of hoses branching off from said outlet hose and said cold air exhaust hose for securing said hoses to an inlet and outlet valve of a second rear tire of the vehicle.

* * * * *